(12) United States Patent
Lebedev et al.

(10) Patent No.: US 11,057,476 B2
(45) Date of Patent: Jul. 6, 2021

(54) SYSTEM AND METHOD FOR MANAGING COMMUNICATION SYSTEM

(71) Applicant: Genesys Telecommunications Laboratories, Inc., Daly City, CA (US)

(72) Inventors: Sergey Lebedev, Walnut Creek, CA (US); Aleksey Kovalenko, Burlingame, CA (US)

(*) Notice: Subject to any disclaimer, the term of this patent is extended or adjusted under 35 U.S.C. 154(b) by 23 days.

(21) Appl. No.: 15/938,918

(22) Filed: Mar. 28, 2018

(65) Prior Publication Data

US 2019/0306252 A1 Oct. 3, 2019

(51) Int. Cl.
| | |
|---|---|
| *G06F 15/16* | (2006.01) |
| *H04L 29/08* | (2006.01) |
| *H04L 12/18* | (2006.01) |
| *H04L 12/58* | (2006.01) |

(52) U.S. Cl.
CPC ........ *H04L 67/145* (2013.01); *H04L 12/1827* (2013.01); *H04L 67/148* (2013.01); *H04L 51/04* (2013.01)

(58) Field of Classification Search
CPC . H04L 67/145; H04L 12/1827; H04L 67/148; H04L 51/046; H04L 51/02
USPC .......................... 709/206, 217, 227, 238, 239
See application file for complete search history.

(56) References Cited

U.S. PATENT DOCUMENTS

| | | | | |
|---|---|---|---|---|
| 7,809,841 | B1* | 10/2010 | Crouch ................. | G06Q 30/08 709/227 |
| 9,591,083 | B1* | 3/2017 | Gumbula ............. | H04L 67/145 |
| 2004/0078446 | A1* | 4/2004 | Daniell ................. | H04L 63/102 709/206 |
| 2009/0077243 | A1* | 3/2009 | Garg ....................... | H04L 67/14 709/228 |
| 2010/0299223 | A1* | 11/2010 | Crouch .................. | G06Q 30/08 705/26.3 |
| 2015/0180985 | A1* | 6/2015 | Seibert .................. | H04L 67/143 709/206 |
| 2015/0281447 | A1* | 10/2015 | Griesmer ............ | H04M 3/5166 379/265.02 |
| 2015/0378561 | A1 | 12/2015 | Ollinger et al. | |

(Continued)

OTHER PUBLICATIONS

International Search Report and Written Opinion dated Jul. 1, 2019 in related PCT Application PCT/US19/24246 with international filing date Mar. 27, 2019.

(Continued)

*Primary Examiner* — Kaylee J Huang

(57) ABSTRACT

In a method for managing a communication system, the method includes: identifying, by a processor, initiation of a chat communication session with a user device operated by a user; establishing, by the processor, a connection to the chat communication session by an automated chat resource; routing, by the processor, the chat communication session to a first agent device operated by a first agent; detecting, by the processor, a disconnection of the user device from the chat communication session; maintaining, by the processor, the connection to the chat communication session by the automated chat resource during a timeout period after the disconnection of the user device is detected; detecting, by the processor, the user device reconnecting to the chat communication session; and routing, by the processor, the chat communication session to a contact center resource.

18 Claims, 8 Drawing Sheets

(56) References Cited

U.S. PATENT DOCUMENTS

| | | |
|---|---|---|
| 2015/0378577 A1 | 12/2015 | Lum et al. |
| 2016/0080572 A1* | 3/2016 | Murugasen ......... H04M 3/5231 379/266.07 |
| 2016/0127553 A1* | 5/2016 | McCormack ........... H04L 51/04 379/265.03 |
| 2016/0295018 A1* | 10/2016 | Loftus ................. H04M 3/2281 |
| 2017/0095674 A1* | 4/2017 | Hresko ................ A61N 1/3993 |
| 2017/0324866 A1 | 11/2017 | Segre et al. |
| 2017/0324867 A1* | 11/2017 | Tamblyn ............. H04M 3/5191 |
| 2017/0324868 A1 | 11/2017 | Tamblyn et al. |
| 2018/0103150 A1* | 4/2018 | Chavez ............... H04L 12/1496 |
| 2018/0341685 A1* | 11/2018 | Indyk ...................... G06F 16/00 |
| 2018/0349920 A1* | 12/2018 | Katib ................. G06Q 30/0185 |
| 2019/0012390 A1* | 1/2019 | Nishant ............. G06F 17/30867 |
| 2019/0163916 A1* | 5/2019 | Steele ................... G06F 21/577 |

OTHER PUBLICATIONS

Canadian Office Action issued in co-pending application No. 3,061,344 dated Jul. 16, 2020.

\* cited by examiner

SYSTEM AND METHOD FOR MANAGING COMMUNICATION SYSTEM

FIELD

Aspects of embodiments of the present invention relate to a system and method for managing a communication system.

BACKGROUND

In order to remain competitive in the modern commerce system, many businesses remain constantly vigilant of evolving consumer demands, and strive to provide customers with the high quality products and services that they desire. To that end, many businesses employ contact centers that include automated systems and representatives of the business to process transactions and/or service the needs of their customers.

Such contact centers may utilize a number of communication channels to engage with customers, such as telephone, email, live web chat, and the like. For example, in many instances, an end user or customer may be routed to a live human agent to assist the end user with his or her needs.

The above information discussed in this Background section is only for enhancement of understanding of the background of the described technology and therefore it may contain information that does not constitute prior art that is already known to a person having ordinary skill in the art.

SUMMARY

Embodiments of the present invention are directed to systems and methods for managing chat automation.

According to some embodiments of the present invention, in a method for managing a communication system, the method includes: identifying, by a processor, initiation of a chat communication session with a user device operated by a user; establishing, by the processor, a connection to the chat communication session by an automated chat resource; routing, by the processor, the chat communication session to a first agent device operated by a first agent; detecting, by the processor, a disconnection of the user device from the chat communication session; maintaining, by the processor, the connection to the chat communication session by the automated chat resource during a timeout period after the disconnection of the user device is detected; detecting, by the processor, the user device reconnecting to the chat communication session; and routing, by the processor, the chat communication session to a contact center resource.

According to some embodiments, the contact center resource is the first agent device.

According to some embodiments, the contact center resource is a second agent device operated by a second agent.

According to some embodiments, the method further includes transmitting, by the processor, an automated communication message to the chat communication session.

According to some embodiments, the method further includes transmitting, by the processor, an alert to the first agent device in response to detecting the user device reconnecting to the chat communication session.

According to some embodiments, the method further includes transmitting, by the processor, an alert to a second agent device operated by a second agent in response to detecting the user device reconnecting to the chat communication session.

According to some embodiments, the method further includes transmitting, by the processor, a message to the chat communication session to prompt the user that the first agent is not available.

According to some embodiments, the method further includes transmitting, by the processor, a message to the chat communication session to prompt the user to initiate a communication via an alternative communication channel with the contact center resource.

According to some example embodiments, a communication system includes: a processor; and a memory coupled to the processor, wherein the memory stores instructions that, when executed by the processor, cause the processor to: identify initiation of a chat communication session with a user device operated by a user; establish a connection to the chat communication session by an automated chat resource; route the chat communication session to a first agent device operated by a first agent; detect a disconnection of the user device from the chat communication session; maintain the connection to the chat communication session by the automated chat resource during a timeout period after the disconnection of the user device is detected; detect the user device reconnecting to the chat communication session; and route the chat communication session to a contact center resource.

According to some example embodiments, the contact center resource is the first agent device.

According to some example embodiments, the contact center resource is a second agent device operated by a second agent.

According to some example embodiments, the instructions further cause the processor to transmit an automated communication message to the chat communication session.

According to some example embodiments, the instructions further cause the processor to transmit an alert to the first agent device in response to detecting the user device reconnecting to the chat communication session.

According to some example embodiments, the instructions further cause the processor to transmit an alert to a second agent device operated by a second agent in response to detecting the user device reconnecting to the chat communication session.

According to some example embodiments, the instructions further cause the processor to transmit a message to the chat communication session to prompt the user that the first agent is not available.

According to some example embodiments, the instructions further cause the processor to transmit a message to the chat communication session to prompt the user to initiate a communication via an alternative communication channel with the contact center resource.

According to some example embodiments, in a system for managing a contact center communication system, the system includes: means for identifying initiation of a chat communication session with a user device operated by a user; means for establishing a connection to the chat communication session by an automated chat resource; means for routing the chat communication session to a first agent device operated by a first agent; means for detecting a disconnection of the user device from the chat communication session; means for maintaining the connection to the chat communication session by the automated chat resource during a timeout period after the disconnection of the user device is detected; means for detecting the user device reconnecting to the chat communication session; and means for routing the chat communication session to a contact center resource.

According to some example embodiments, the contact center resource is the first agent device.

According to some example embodiments, the contact center resource is a second agent device operated by a second agent.

According to some example embodiments, the system further includes means for transmitting an automated communication message to the chat communication session.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
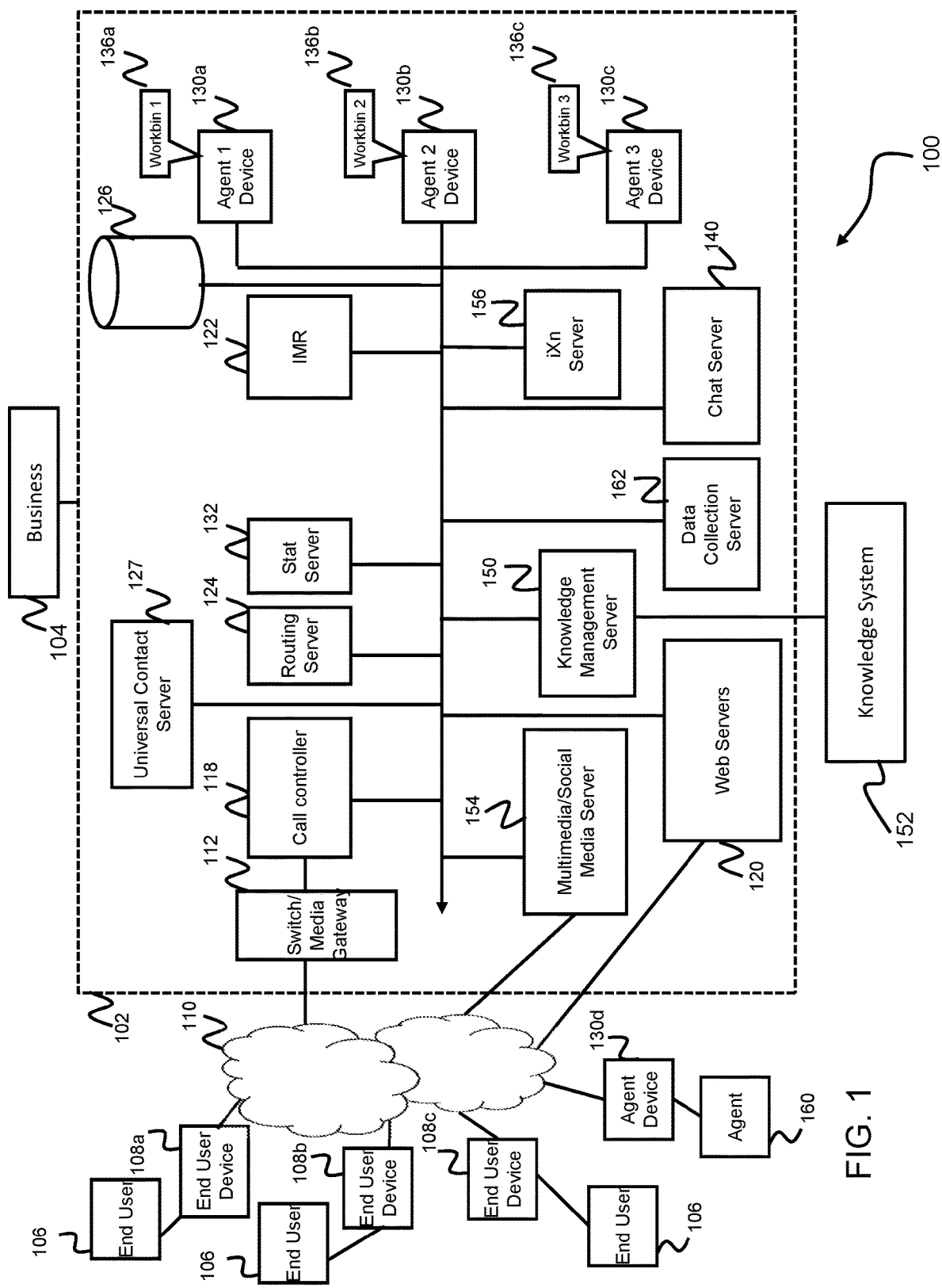
FIG. 1 is a block diagram of a contact center management system according to some embodiments of the present invention.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Generally, modern contact centers are staffed with agents or employees who serve as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls or voice over IP or VoIP calls), video (e.g., video conferencing), text (e.g., emails and text chat), or through other media.

In order to remain competitive, however, businesses constantly strive to provide high quality service to customers while keeping overhead costs low and maintaining or growing revenue and profitability. To that end, sophisticated businesses strive to monitor and maintain data regarding a wide variety of performance metrics of the business overall as well as the operations of individual aspects of the business. For example, in the context of contact center systems, businesses may monitor and collect data regarding wait and hold time for customers, idle time for agents, technical support quality, sales and marketing activities, and the like. Managers and supervising agents may access such data periodically in order to stay informed about the business goals of the contact center, to correct problems as they occur, and to generally ensure the contact center is performing at a high level. In many instances, various agents of the contact center system may wish to collaborate with one another to correct, improve, or maintain one or more performance metrics monitored by the contact center system.

Additionally, modern contact center communication systems may enable or support communication between customers and agents through a variety of communication channels, including telephony, VoIP, video, SMS text messaging, chat dialog communication, and a variety of other communication channels. In the context of chat communication sessions, in certain instances, it may be helpful for customers and agents to resume a communication session after it is disconnected, without losing the previous chat communications. For example, a customer's electronic communication device may lose connectivity to a communication network connected to the contact center communication system, but it may be desirable for the customer to be able to resume the chat communication session where it left off once the customer's electronic communication device is able to re-establish communication with the communication network. Embodiments of the present invention provide a system and method to enable agents to interact with customers in a text-based or chat communication channel and resume the chat communication session after a disconnection during the communication session.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

FIG. 1 is a block diagram of a system for engaging and managing conversations between an automated chat robot and human users (hereinafter referred to as a contact center management system 100), according to some embodiments of the present invention. In some embodiments, the contact center management system 100 may operate as part of a contact center system 102. The contact center system may be an in-house facility to a business or enterprise 104 for serving the enterprise in performing the functions of sales and service relative to the products and services available through the enterprise. In another aspect, the contact center system 102 may be operated by a third-party service provider. According to another embodiment, the contact center system 102 may operate as a hybrid system in which some components of the contact center system 102 are hosted at the contact center premise and other components are hosted remotely (e.g., in a cloud-based environment).

The contact center system 102 may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one example embodiment, the contact center system 102 includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end user 106) desiring to receive services from the contact center system 102 or the business 104 may initiate an inbound communication to the contact center system 102 via their end user devices 108a-108c (collectively referenced as electronic device 108).

Each of the electronic devices 108 may be a communication device conventional in the art, such as, for example, a telephone, wireless phone, smart phone, personal computer, electronic tablet, and/or the like, that is configured to engage in text-based (e.g., chat) communications with other electronic devices. According to some embodiments, users operating the electronic devices 108 may communicate with the contact center system 102 by way of a voice channel, and the communication may be converted into text either at the end user or contact center side. The text may then be transmitted to an automated chat resource (also referred to herein as a "chat bot," described in more detail below), and the response from the chat bot may be converted back into speech or delivered to the end user's device as text. Users operating the electronic devices 108 may initiate, manage, and respond to telephone calls, emails, chats, text messaging, web-browsing sessions, and other multi-media transactions.

Inbound and outbound communications from and to the electronic devices 108 may traverse the telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, and/or any 3G or 4G network conventional in the art.

According to one example embodiment, the contact center system 102 includes a switch/media gateway 112 coupled to the communications network 110 for receiving and transmitting telephony interactions between end users and the contact center system 102. The switch/media gateway 112 may include a telephony switch or communication switch configured to function as a central switch for agent level routing within the center. The switch may be a hardware switching system or a soft switch implemented via software. In this regard, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony device. In this example, the switch/media gateway establishes a voice path/connection (not shown) between the calling customer and the agent telephony device, by establishing, for example, a connection between the customer's telephony device and the agent telephony device.

According to one example embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some example embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one example embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by the routing server 124 to route the call or communication to an appropriate contact center system 102 resource.

If the communication is to be routed to an agent, the call controller 118 interacts with a routing server 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, NoSQL, SQLite, and the like, and may be stored in a mass storage device 126. The routing server 124 may query the customer information from the customer database via an ANI or any other information collected by the IMR 122.

Once an appropriate agent is identified as being available to handle a communication, a connection may be made between the customer and an agent device 130a-130d (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms. According to some embodiments, one or more agents or supervising agents 160 may operate one or more agent devices 130d in communication with the components of the contact center system 102 by way of the data communication network 110.

The contact center system may also include a multimedia/social media server 154 for engaging in media interactions other than voice interactions with the end user devices 108. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events. According to some embodiments, the multimedia/social media server 154 may be configured to maintain chat conversations, generate chat transcripts, and determine whether or not a chat communication is completed (e.g., based on timeout or by a customer closing a chat window). Additionally, the multimedia/social media server 154 may be configured to keep a chat session alive even when a particular chat server instance crashes, and also process or facilitate chat transfers and conference sessions.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system 102, the web servers may also be provided by third parties and/or be maintained outside of the contact center. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one example embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one example embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like.

According to one embodiment, some of the data (e.g. customer profile data) may be maintained in a customer relations management (CRM) database hosted in the mass storage device 126 or elsewhere. The mass storage device may take form of a hard disk or disk array, flash memory, magnetic table, or other suitable mass storage device as is conventional in the art, for storing information used as part of the contact center management system 100 and the contact center system 102.

According to some embodiments, the contact center system 102 may include a universal contact server (UCS) 127, configured to retrieve information stored in the CRM database and direct information to be stored in the CRM database. For example, the UCS 127 may be utilized as part of the contact center management system 100 to facilitate maintaining a history on how well a particular chat bot (described in more detail below) functions for a given customer as a reference for future chat communications. The UCS 127 may also be configured to facilitate maintaining a history of customers' preferences regarding media channels, such as instances in which chat communications are acceptable and instances in which customers prefer alternate media channels. Additionally, the UCS 127 may be configured to capture and store data regarding comments from agents, customer communication history, and the like.

The contact center system 102 may additionally include a knowledge management server 150 for facilitating interactions between customers operating the end user devices 108a-108c and a knowledge system 152 (which may be included as part of the contact center system 102, or may be operated remotely by a third party). The knowledge management server 152 is a computer system capable of receiving questions and providing answers as output. According to some example embodiments, the knowledge system may be embodied as IBM Watson®. Of course, any other knowledge system may be used as will be appreciated by a person having ordinary skill in the art. In some embodiments, the knowledge system 152 is an artificially intelligent computer system capable of answering questions posed in natural language by retrieving information from information sources such as encyclopedias, dictionaries, newswire articles, literary works, or other documents submitted to the knowledge system 152 as reference materials, as is well known in the art. Additional details of the knowledge management server is provided in U.S. application Ser. No. 14/449,018, filed on Jul. 31, 2014, entitled "System and Method for Controlled Knowledge System Management," the content of which is incorporated herein by reference.

The contact center system 102 may additionally include a chat server 140 for conducting automated/electronic chat communications with agents operating agent devices 130. According to some embodiments, the chat server 140 may operate as a chat orchestration server, dispatching actual chat conversations to various chat bots or agent chats. The processing logic of the chat server 140 may be rules driven, and may leverage, for example, intelligent workload distribution protocols and various business rules for routing communications.

According to some embodiments, the chat server 140 is coupled to (directly or indirectly) and in communication with the interaction server 156, statistics server 132, a data collection server 162, the call controller 118, and/or the like, for retrieving data regarding ongoing contact center operations and performance metrics in real time. Although the chat server 140 is depicted in the embodiment of FIG. 1 as being a separate server component, a person of skill in the art should recognize that functionalities of the chat automation server may be incorporated into the multimedia/social media server 154, the knowledge management server 105, the IMR server 122, or the like.

The contact center system 102 may also include the data collection server 162 configured to retrieve data from various components of the contact center system such as, for example, the statistics server 132, and to generate reports from the aggregated data. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like). According to some example embodiments, the data collection server 162 may collect data from the components in the contact center system such as the statistics server 132 and the call controller 118 on a regular or pre-configured periodic schedule. The data collection server 162 may then operate to aggregate the data and generate graphical or text-based representations of performance metrics based on the retrieved data.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
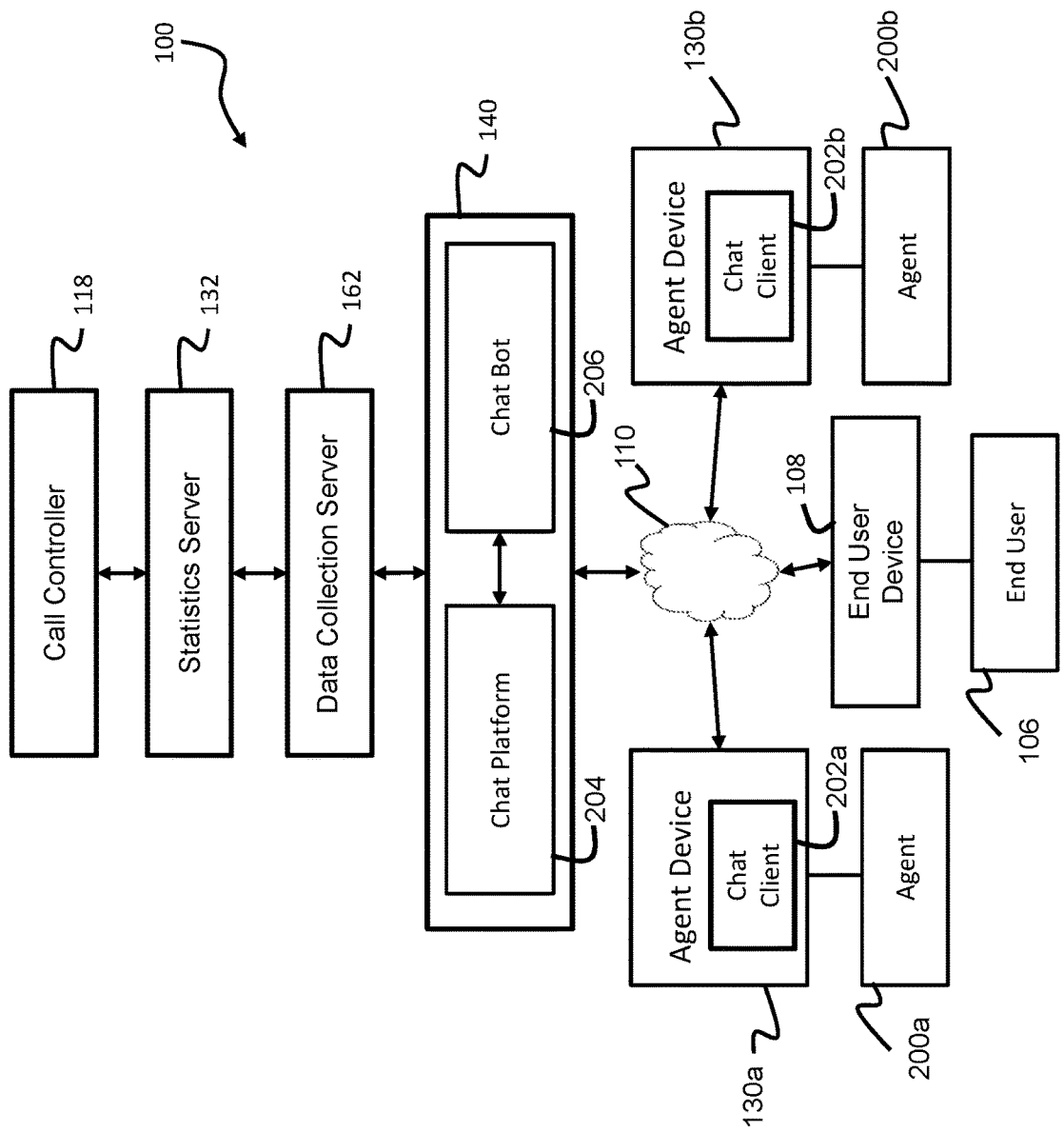
FIGS. 2 and 3 are block diagrams of some components of the contact center management system, according to some example embodiments of the present invention.

FIG. 2 is a more detailed block diagram of some components of the contact center management system, according to some example embodiments of the present invention. The chat server 140 is coupled to or in electronic communication with one or more agent devices 130 (e.g., agent devices 130a and 130b) operated by one or more agents 200 (e.g., agents 200a and 200b, respectively) over the data communications network 110 and/or operating locally within the contact center system 102.

Each agent device 130 may have a communication or chat client or module 202 (e.g., modules 202a and 202b) operating locally on the agent device as a user interface for exchanging communications with other agent devices and the chat server 140 by way of a chat platform module 204. According to some embodiments, the chat client or module 202 may be configured to provide a graphical user interface for exchanging graphical and/or text-based communications with the chat server 140. The chat platform module 204 operates as an intermediary for receiving and transmitting information received from and to agent devices, a chat automation module (or chat bot) 206, and other components of the contact center system 102 (e.g., the data collection server 162, the statistics server 132, and the call controller 118).

According to some embodiments, the chat bot 206 is a party to the chat communication session and is configured to listen to the chat dialog (e.g., receive and analyze chat communication messages exchanged between other participants) and monitor the state of other chat participants (e.g., joining, leaving, disconnecting, etc.). The chat bot 206 operates to provide automated messages for display in response to the input from agent devices and user devices based on the content of the messages exchanged between the agent devices and user devices. According to one embodiment, the chat bot 206 is agnostic, and utilizes an analytical platform for analyzing inbound text and generating output text based on the chat dialog. In one example, the chat bot 206 serves as a proxy for converting user requests to analytical systems and returning notifications and responses back to the chat dialog. Further detail of the chat bot 206 is described below with respect to FIG. 3.

According to some embodiments, the chat bot 206 and the chat platform 204 may operate as part of the chat server 140, or may operate on independent servers, depending on the design of the contact center system 102.

The chat server 140 is further coupled to or in electronic communication with the data collection server 162. The data collection server 162 collects/retrieves data related to various performance metrics from various components of the contact center system 102, for example, the statistics server 132 and the call controller 118. As discussed above, according to some embodiments, the data collection server 162 may retrieve analytics and performance metric data from the statistics server 132 and/or the call controller 118 on a regular or pre-configured periodic schedule. Utilizing the data retrieved from the statistics server 132 and/or the call controller 118, the data collection server 162 may generate aggregated data and numerical data points representing one or more key performance indicators (KPIs) that are relevant to the business operations of the contact center.

As will be described in further detail below, the chat bot 206 may be configured to receive, as input data, messages transmitted from the agent devices 130, and use text analytics to identify keywords or phrases (e.g., predefined chat commands), or selection of one or more prompts.

According to some example embodiments, the chat bot 206 is a participant of each chat session conducted between the agent devices 130 and customer devices 108. The chat bot 206 may operate as an active participant, for example, by automatically transmitting chat communication messages to the chat communication session in response to a text analytics analysis on messages received from the customer device 108 and/or the agent device 130.

Additionally, when one or both of the agent devices 130 and customer devices 108 disconnects from a chat communication session, the chat bot 206 may remain an active with the chat communication session, thereby keeping the chat communication session open and enabling either or both of the agent device 130 and the customer device 108 to return or disconnect repeatedly until the communication session is affirmatively ended, at which point all parties, including the chat bot 206 are disconnected from the chat communication session. The chat communication session is then closed, and the corresponding data associated with the chat communication session, such as the chat dialog transcript, the participants of the chat communication session, and/or various other data about the nature and substance (e.g., topics of communication, outcomes, etc.) may be stored in memory (e.g., memory 126) as contextual information associated with the customer or user profile of the customer.

Thus, according to example embodiments of the present invention, when a user device 108 and an agent device 130 are disconnected or drop from a chat communication session, the chat communication session is kept active by virtue of the chat bot 206 remaining connected to the chat communication session. A user device 108 or agent device 130 may be determined by the communication system 100 to be disconnected from a chat communication session if the user device 108 and/or the agent device 130 by any suitable mechanism. According to some embodiments, the communication system 100 may determine a user device 108 or agent device 130 is disconnected from the chat communication session in response to failing to receive any chat communication messages from the user device 108 or the agent device 130 for a period of time that exceeds a predetermined timeout period. In some embodiments, the communication system 100 may determine a user device 108 or agent device 130 is disconnected from the chat communication session in response to the user device 108 or agent device 130 failing to request updates to the chat communication session (e.g., for longer than a predetermined timeout period). In some embodiments, the disconnection determination may be based on the communication system 100 determining or detecting a communication failure or communication disconnection between the user device 108 or agent device 130 and the communication network 110.

In response to detecting the agent device 130 is disconnected from a chat communication session, the communication system 100, through the chat bot 206 may automatically route the communication session to a different agent device 130 to enable the user to continue the chat communication session with a different agent. Alternatively, the communication system 100, through the chat bot 206 may transmit a message to the chat communication session asking the user to patiently wait until the agent reconnects or asking whether the user is willing to have the communication session routed to another agent device operated by a different agent. In the case where the communication session is routed to a different agent, the transcript of the chat communication session may be transmitted to the new agent's electronic device and appear in a chat dialog graphical user interface operating on the new agent's device.

In response to detecting the user device 108 is disconnected from a chat communication session, the communication system 100 may transmit an alert or notification to the agent device 130 that the user device 108 is disconnected. In some embodiments, the communication system 100 may prompt the agent to remain engaged with the chat communication session for a predetermined period of time to allow the user device 108 to reconnect with the chat communication session.

According to embodiments of the present invention, if both the user device 108 and the agent device 130a disconnect from the chat communication session, the chat bot 206 will maintain an active connection with the chat communication session for a predetermined period of time (e.g., a waiting period) before leaving the chat communication session thereby ending or closing the chat communication session. If, during the waiting period, the communication system 100 receives a new communication from the user device 108, the communication system 100 may end the countdown of the waiting period. Additionally, once the user device 108 reengages with the communication session, for example, by asking a question or providing a new comment to the chat dialog, the communication system 100 may transmit an alert to the agent device 130 indicating the user device 108 has reconnected with the chat communication session and/or route the communication session to the agent device 130a of the agent who previously was engaging in the chat communication session with the user device 108.

In some embodiments, if the agent operating the agent device 130a is unavailable after the user device 108 reconnects to the chat communication session (after having previously disconnected), the communication system 100 may cause the chat bot 206 to engage in automated communications with the user device 108. For example, the chat bot 206 may transmit a message to the chat communication session to alert the user that the previous agent operating the agent device 130a is unavailable, and prompting the user to wait until the agent becomes available. Additionally or alternatively, the chat bot 206 may engage in automatically providing automated messages to the chat communication session in response to inquiries or messages received from the user device 108. For example, the chat bot 206 may initiate inquiries regarding the needs or desires of the user operating the user device 108 and, after performing a text analytics operation on the user response, may identify one or more keywords or phrases and automatically generate a response. In some embodiments, such automated responses may be generated in coordination with the knowledge system 152, for example, by submitting an inquiry to the knowledge system 152 and generating an automated response based on the output of the knowledge system 152. In some embodiments, the chat bot 206 may identify a message received from the user device 108 as corresponding to one or more predetermined keywords or phrases, and provide a predetermined automated response.

Additionally, according to some embodiments, when a user device 108 reconnects to a chat communication session after previously disconnecting from the chat communication session (e.g., as discussed above), the communication system 100 may, through the chat bot 206, transmit a message to the communication session prompting the user operating the user device 108 to initiate a communication with a contact center resource and/or the agent operating the agent device 130a via an alternative communication channel, such as telephony, email, SMS text message, and the like.

In some embodiments, in response to the user device 108 reconnecting to a chat communication session after previously disconnecting from the chat communication session, and the agent operating the agent device 130a is unavailable, the communication system 100 may route the communication session to a different agent operating an agent device 130b, instead of the agent operating the agent device 130a. The chat communication session text dialog may be transmitted to the agent device 130b, or displayed by the agent device 130b, and the agent operating the agent device 130b can continue the communication session with the user operating the user device 108 and the chat bot 206. According to some embodiments, the communication system 100, through the chat bot 206, may transmit a message to the user device 108 requesting permission from the user to route the communication session to a different agent prior to doing so. Alternatively, in some embodiments, the communication system 100 may automatically route the communication session to the different agent without first informing the user.

Figure 3:
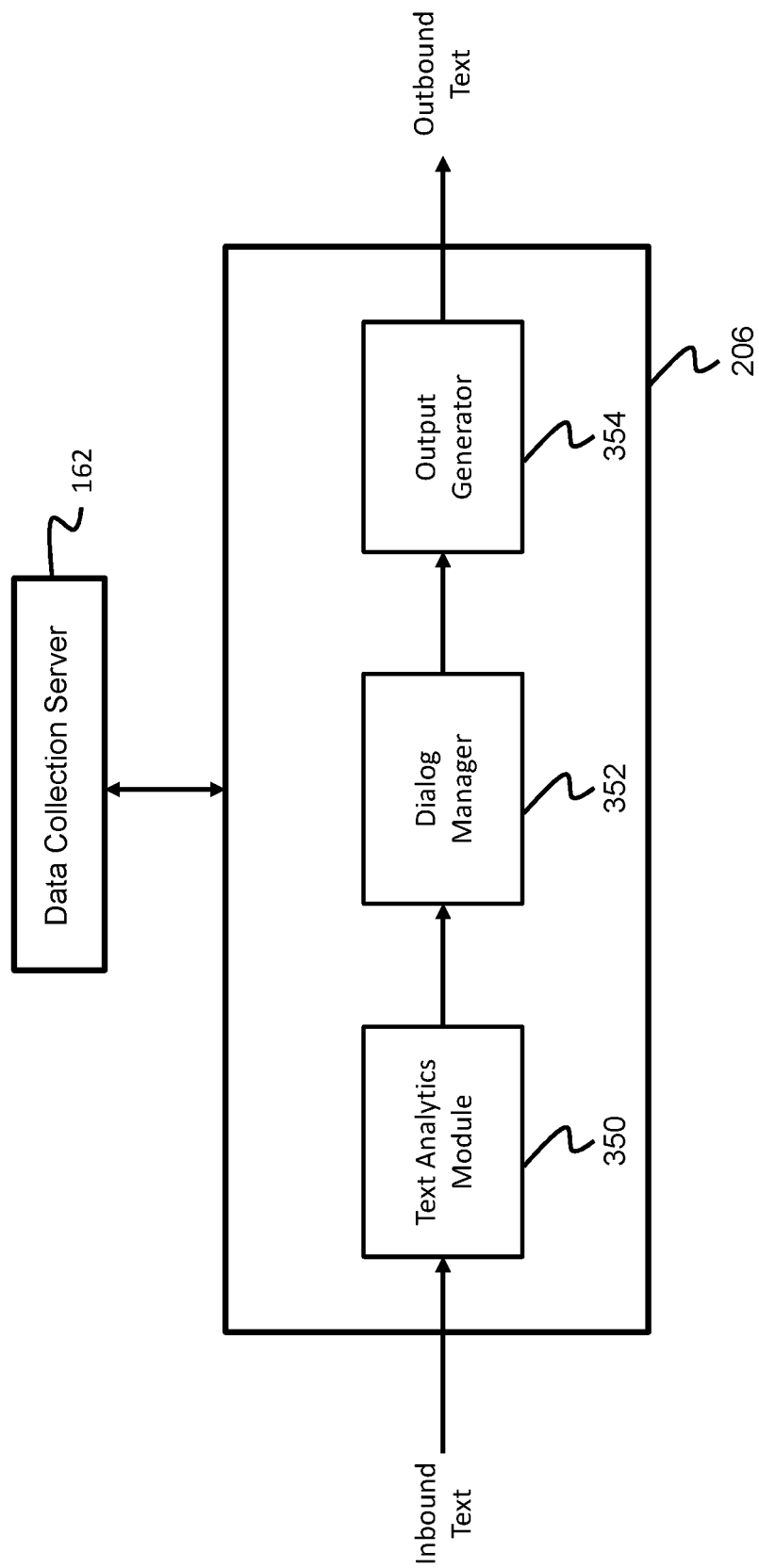

FIG. 3 is a more detailed block diagram of the chat bot 206 operating as part of the contact center management system, according to some example embodiments of the present invention. According to some example embodiments, the chat bot 206 may include a text analytics module 350, a dialog manager 352, and an output generator 354. The text analytics module is configured to analyze and understand natural language. In this regard, the text analytics module may be configured with a lexicon of the language, a syntactic/semantic parser, and grammar rules for breaking a phrase provided by the agent device 130, into an internal syntactic and semantic representation.

The dialog manager 352 receives the syntactic and semantic representation from the text analytics module, and manages the general flow of the conversation based on a set of decision rules. In this regard, the dialog manager maintains history and state of the conversation, and generates an outbound communication based on the history and state.

The dialog manager 352 selects a response deemed to be appropriate at the particular point of the conversation in response to the inbound text and data received or retrieved from the data collection server 162, and outputs the response to the output generator 354. For example, according to some embodiments, the text analytics module 350 and/or the dialog manager 352 may detect, based on text analytics of the chat communication session between agents, that a particular phrase has been used or topic of conversation has come up. Alternatively, the text analytics module 350 and/or the dialog manager 352 may detect an agent inputting a predetermined command or phrase to the chat interface. The output generator 354 takes the semantic representation of the response provided by the dialog manager 352 and outputs an outbound text to be displayed in the communication session.

Figure 4:
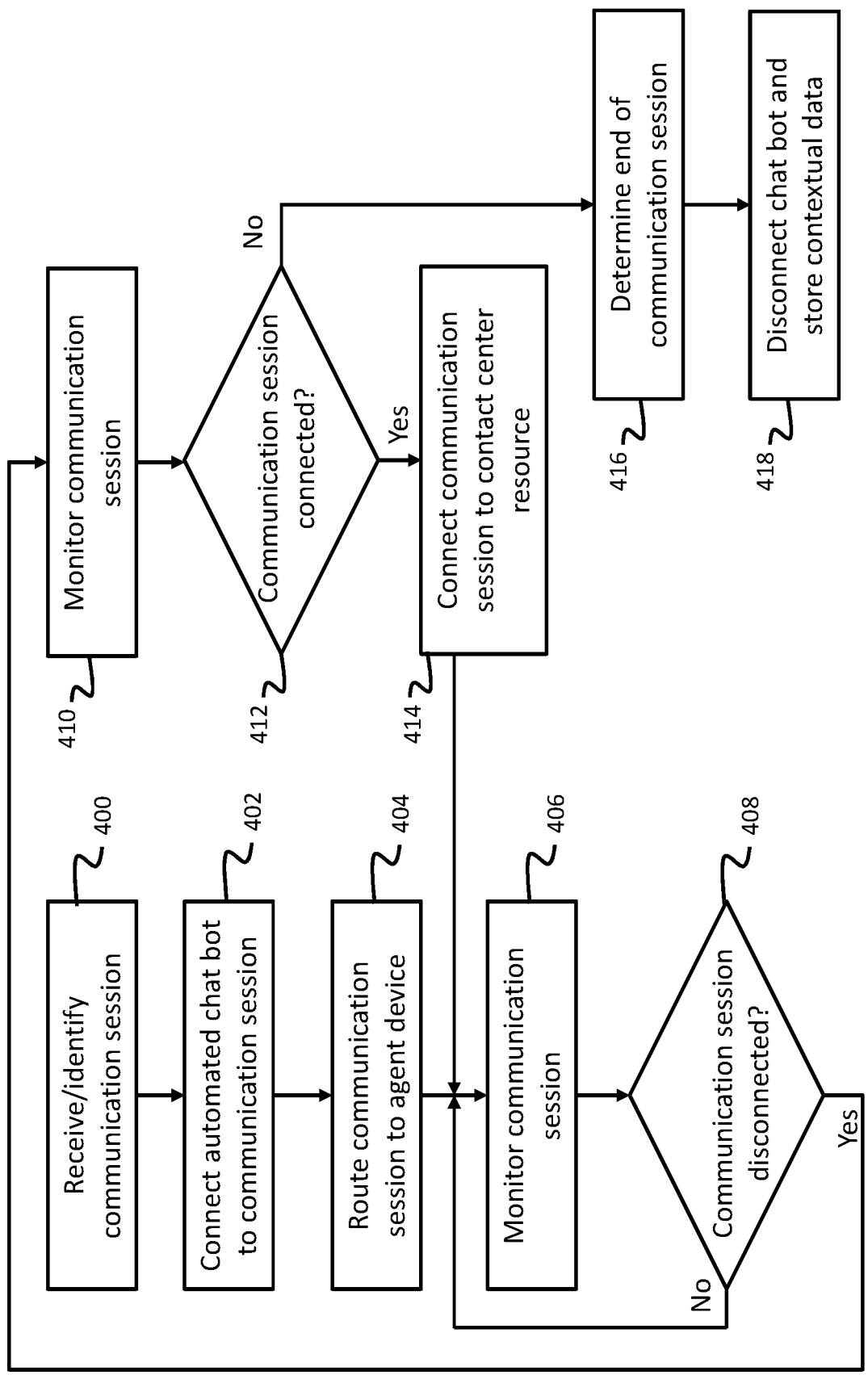
FIG. 4 is a flow diagram illustrating a process for managing a communication system, according to some example embodiments of the present invention.

FIG. 4 is a flow chart illustrating interactions between various components operating as part of a method for managing a contact center system, according to some example embodiments of the present invention. Although various operations are illustrated in FIG. 4, the number and order of operations according to some embodiments may vary. For example, according to some embodiments, there may be fewer or additional operations and/or the order of the operations may vary.

As illustrated in FIG. 4, at 400, the communication system 100 receives or identifies a signal or message from a user device indicating a communication session is being initiated. For example, according to some embodiments, the communication system 100 may receive a signal or message from a user device (e.g., user device 108) indicating the corresponding user has input a text-based or chat communication message into a chat dialog module operating on or accessible through the user device. The communication system 100 may then initiate or open a chat communication session. The communication system 100 may store a transcript of the chat communication session in memory, and update the transcript as additional chat communication messages are exchanged between parties to the chat communication session.

At 402, the communication system 100 may connect an automated chat communication resource or chat bot (e.g., a chat bot 206) to the chat communication session. As discussed above, the chat bot may be an active participant in the chat communication session, and the chat bot is configured to monitor chat communications exchanged between participants to the chat communication session. In some embodiments, the chat bot may engage in or provide automated chat communication messages to participants of the chat communication session. For example, prior to the chat communication session being routed to an agent device, the chat bot may provide messages to the chat communication session to prompt the user to provide information about the user and/or the purpose of the user initiating the chat communication session.

At 404, the communication system 100 may route the chat communication session to an agent device (e.g., agent device 130a) operated by an agent of the contact center. For example, in some embodiments, the communication system 100 may route the chat communication session to an agent qualified to handle the communication session based on the user chat communication messages and/or user profile information. In some embodiments, the chat communication system 100 may route the chat communication session to a first available agent, or using any other suitable routing scheme.

At 406, the communication system 100 may monitor the communication session. As discussed above, in some embodiments, the communication system 100, by way of the chat bot (e.g., a chat bot 206) connected to the chat communication system, may provide automated chat communication messages during the chat communication session. Additionally, the communication system 100 monitors the communication session to determine whether or not the communication session is still ongoing and/or whether either the user device or the agent device have disconnected from the communications session.

At 408, the communication system 100 determines whether or not either the user device or the agent device have disconnected from the communication session, and if not, the communication system 100 continues looping through 406 and 408 to monitor the communication session and determine whether or not there is a disconnection. For example, as discussed above, the chat communication system 100 may determine a user device or agent device is disconnected from the communication session if a new message is not received during a first timeout duration (e.g., a first predetermined period of time). Each time a new message is received from the user device and/or the agent device, a clock measuring the first timeout duration may be reset. As another example, the chat communication system 100 may determine a user device or agent device is disconnected from the communication session if the device is no longer requesting updates to the chat communication session from the chat communication system 100. Embodiments of the present invention are not limited to the example techniques for determining a disconnection described herein, and any other suitable mechanism or algorithm for determining a disconnection may be utilized according to various embodiments.

If, at 408, the communication system 100 determines there is a disconnection, at 410, the communication system 100 continues to monitor the communication session for a second timeout duration (e.g., a second predetermined period of time). While monitoring the communication session at 410, the chat bot remains actively connected to the chat communication session, thereby keeping the chat communication session active such that if the disconnected parties return to the communication session, the parties can resume the communication session without the previously exchanged communications being lost or having to be retrieved from a storage device.

At 412, the communication system 100 determines whether or not the communication session is reconnected within the second timeout duration.

If, at 412, the communication system 100 determines a reconnection has occurred, for example, because the communication system 100 receives a new message from the user device, the communication system may proceed, at 414, to connect the communication system to a contact center resource such as the agent device associated with the original agent (e.g., the agent device 130*a*). According to some embodiments, the communication system 100 may transmit an alert or signal to the agent device associated with the original agent, prompting the agent to reconnect to the communication session. For example, the communication system 100 may cause a graphical window or button to appear on the agent device, and the agent will be reconnected to the chat communication session if the agent selects a graphical button.

If, however, the original agent is no longer available or chooses not to reconnect to the chat communication session, according to some embodiments, the communication system 100 may route the communication session to a different agent device associated with a different agent (e.g., the agent device 130*b*). After the communication session is routed or connected to a contact center resource at 414, the communication system 100 resumes monitoring the communication session and determining whether or not there is a disconnection, at 406 and 408, respectively.

If, at 412, the communication system 100 determines a re-connection has not occurred within the second timeout duration, the communication session 100 may proceed, at 416, to determine the communication session has ended and, at 418, the communication system 100 may disconnect the chat bot from the communication session, close the communication session, and store contextual information associated with the communication session (e.g., user profile information, communication session transcript, outcomes of the communication session, etc.) in memory.

Thus, embodiments of the present invention provide a system and method for facilitating chat communication sessions such that various parties to the chat communication session may come and go (e.g., connect and disconnect) multiple times, without the chat communication session ending. A chat bot is instantiated and connected as an active participant to each chat communication session. If a user and/or agent is disconnected from or drops from a chat communication session, the chat communication session is kept active in order to be able to resume the chat.

In the case that one party returns back to the chat, for example, an agent or customer enters a message into the chat dialog, the chat bot will enable the chat communication session to be maintained without ending, and the communication system can connect the chat communication session to available contact center resources. According to some embodiments, the chat communication session may eventually be closed by explicit request (e.g., by the customer or an agent).

Embodiments of the present invention therefore present an improvement to alternative systems in the contact center environment where, if all participants leave or disconnect from the chat communication session, the chat session will be closed, and cannot be resumed. Instead, according to embodiments of the present invention, if there is an expectation or potential that the chat communication session will resume after one or more of the parties leaves or disconnects, the cat bot will keep the chat session alive by remaining an active participant to the chat communication session.

Additionally, according to some embodiments, the chat bot may engage in automated interactions with the participants of the chat communication session. For example, the chat bot may provide automated responses or messages during the communication session. Additionally, in some embodiments, depending on the customer status level (e.g., bronze, silver, gold, platinum, etc.), the communication system may control the chat bot to remain connected to a chat communication session after a disconnection event by the user or agent for different timeout periods, in which the timeout period is longer more important users and shorter for less important users, thereby preserving contact center resources for more important users.

If a user and agent both disconnect from a chat session, and later the user returns and asks a question, but no agent is available, the chat bot can provide or engage in an automated response. For example, the chat bot may be configured to access a knowledge system to provide an automated response, tell the customer to wait, suggest an alternative communication channel, ask the customer if they would be willing to be routed to another agent, or automatically coordinate routing to an alternative available agent.

According to some embodiments, when a chat communication session is initiated, for example, by a customer entering a chat communication message into a chat dialog of a chat interface running on or accessible by the user device, the communication system instantiates a chat bot and the chat bot is connected to the chat communication session. Additionally, the chat communication session is routed to an agent device operated by an agent of the contact center operating the communication system.

At some point, a disconnection may occur, for example, because the user stops responding or leaves the communication session. After the disconnection, the chat bot remains an active participant in the chat communication session for a first predetermined period of time, thereby maintaining the chat communication session in an active state even if all other participants disconnect from the chat communication session. If the user returns to the communication session prior to the expiration of the first predetermined period of time, then the chat bot may engage in some form of automated communication with the user (e.g., utilizing text analytics to determine what the user is saying, and generating automated responses), and the communication system may then route the communication session to an agent device operated by the original agent, or an agent device operated by a different agent if the original agent is unavailable or chooses not to reconnect to the communication session. Additionally, according to some embodiments, during a communication session with an agent, the chat bot can also monitor the conversation and escalate or alert a supervisor if the chat bot determines it would be helpful. The chat bot may also highlight certain terms or provide suggested or automated dialog for the agent to utilize to facilitate progress in the conversation.

For ending the communication altogether, customer or agent may have a button to end the conversation or otherwise provide some explicit indicator. If the connection with a user device is lost during a communication session (e.g., the communication system stops receiving communications from the customer), the communication system may consider that a disconnection, and the chat bot will keep the session open for a predetermined period of time, and end the session after the predetermined period of time has lapsed if there are no further communications received from the customer. Once a communication session is ended, the chat bot will be disconnected, and a transcript of the chat may be saved in a database associated with the customer profile as contextual information.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 5A, FIG. 5B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the example embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 5A:
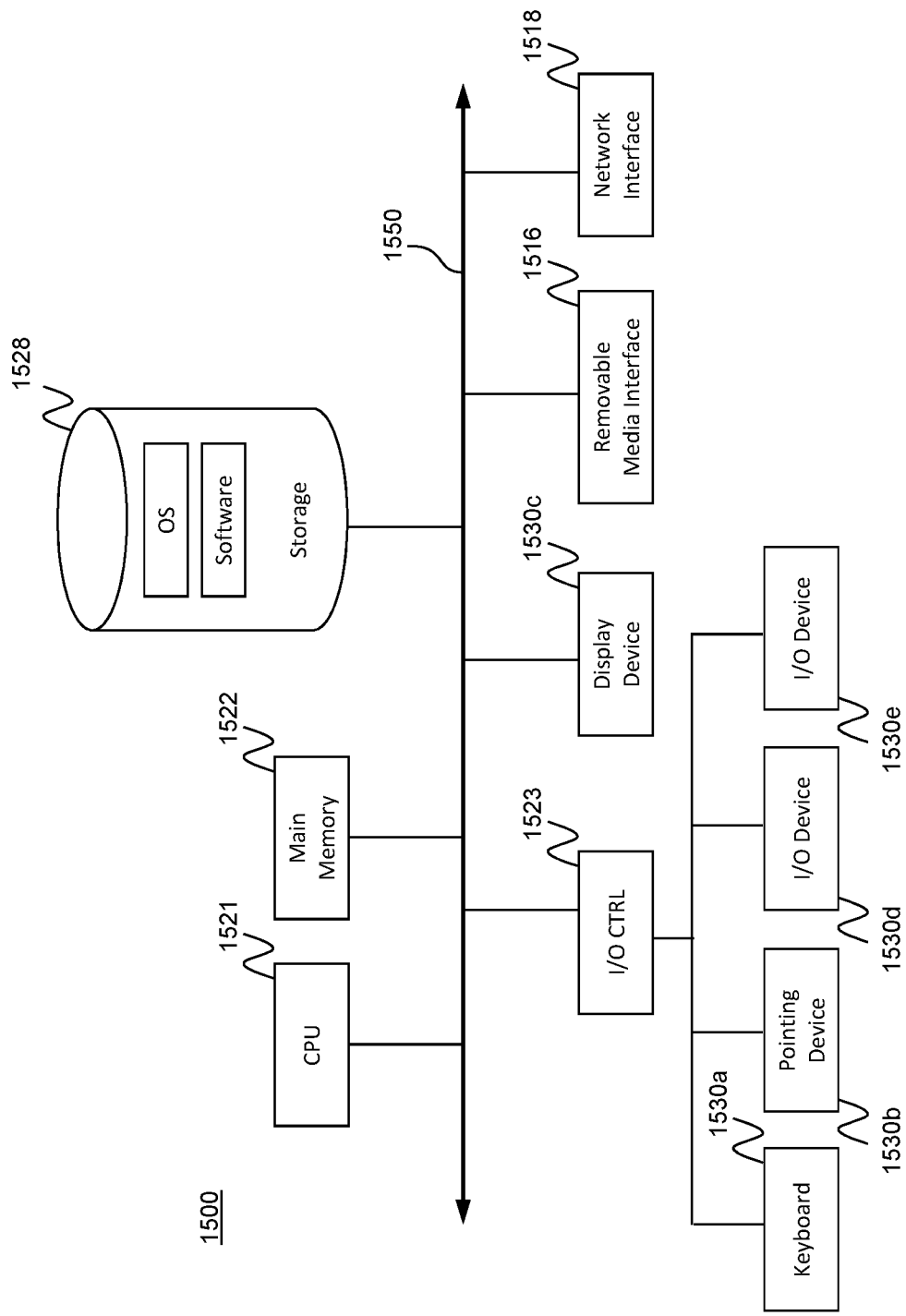
FIG. 5A is a block diagram of a computing device according to an embodiment of the present invention.
Figure 5B:
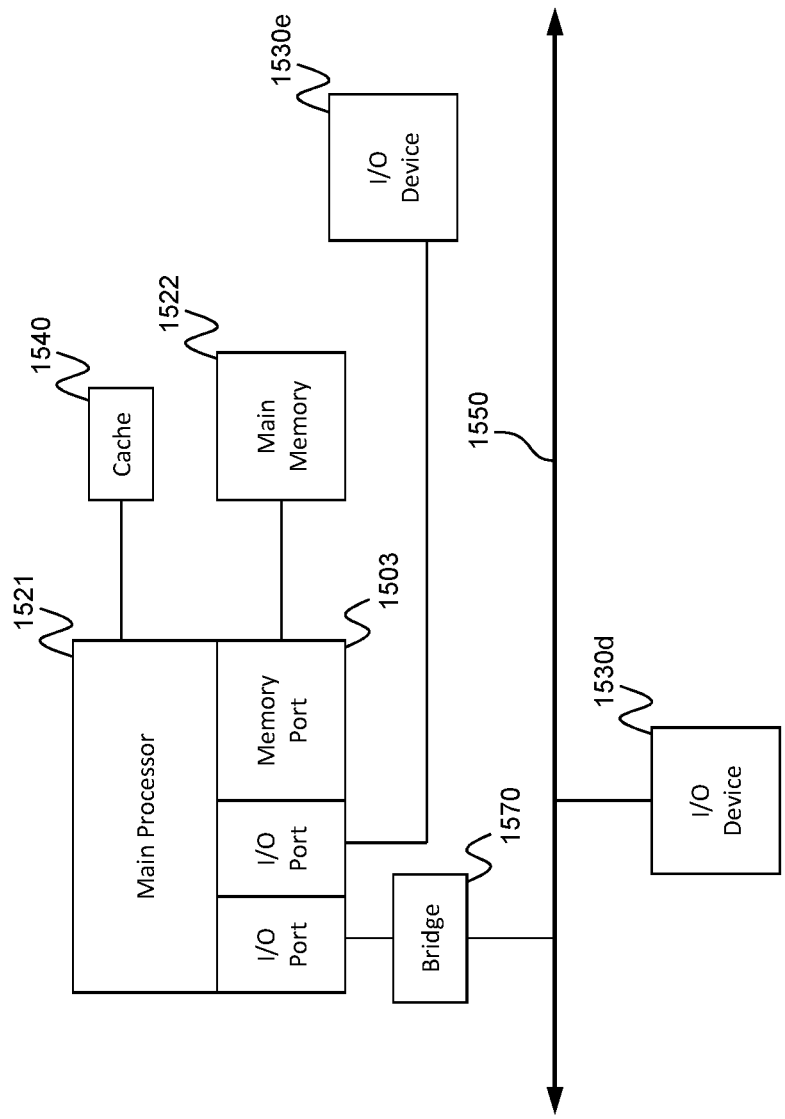
FIG. 5B is a block diagram of a computing device according to an embodiment of the present invention.

FIG. 5A and FIG. 5B depict block diagrams of a computing device 1500 as may be employed in example embodiments of the present invention. Each computing device 1500 includes a central processing unit 1521 and a main memory unit 1522. As shown in FIG. 5A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 5B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 5A, the central processing unit 1521 communicates with the main memory 1522 via a system bus 1550. As shown in FIG. 5B, the central processing unit 1521 may also communicate directly with the main memory 1522 via a memory port 1503.

FIG. 5B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 5A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 5B depicts an embodiment of a computer 1500 in which the central processing unit 1521 communicates directly with I/O device 1530e. FIG. 5B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 5A, may control the I/O devices. The I/O controller may control one or more I/O devices such as a keyboard 1530a and a pointing device 1530b, e.g., a mouse or optical pen.

Referring again to FIG. 5A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 5A and FIG. 5B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 5D:
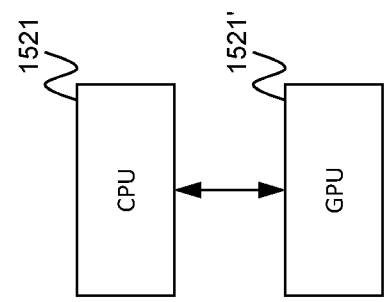
FIG. 5D is a block diagram of a computing device according to an embodiment of the present invention.
Figure 5C:
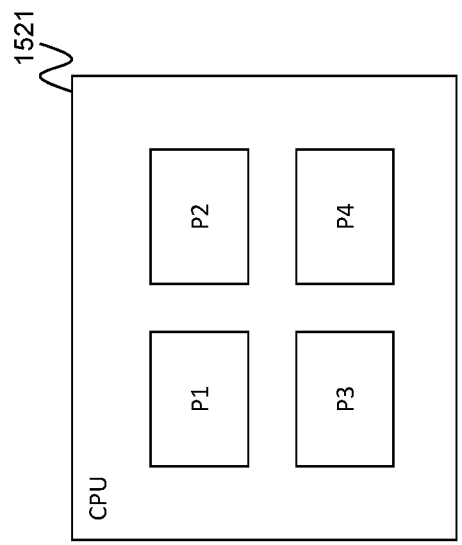
FIG. 5C is a block diagram of a computing device according to an embodiment of the present invention.

As shown in FIG. 5C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one example embodiment, depicted in FIG. 5D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 5E:
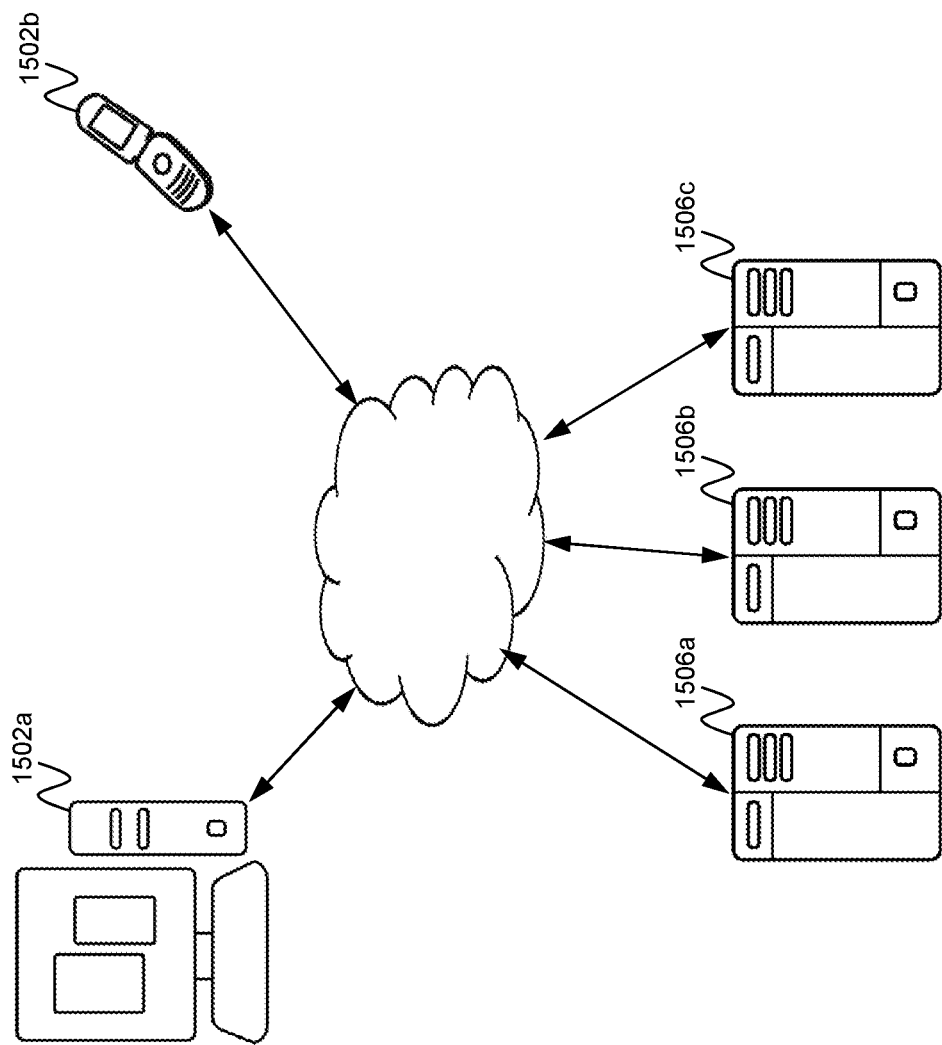
FIG. 5E is a block diagram of a network environment including several computing devices according to an embodiment of the present invention.

A computing device may be one of a plurality of machines connected by a network, or it may comprise a plurality of machines so connected. FIG. 5E shows an example network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 5E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device

1500 to any type of network capable of communication and performing the operations described herein. An I/O device 1530 may be a bridge between the system bus 1550 and an external communication bus.

According to one embodiment, the network environment of FIG. 5E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for managing a communication system of a contact center, the method comprising:
   identifying, by a processor, initiation of a chat communication session through a communication network with a user device operated by a user;
   establishing, by the processor, a first connection to the chat communication session by an automated chat resource, wherein the automated chat resource is configured to listen to chat dialog of the chat communication session and to automatically generate text-based messages for display in response to the chat dialog without human intervention;
   routing, by the processor, the chat communication session to a first agent device operated by a first agent to create a second connection to the chat communication session while also maintaining the first connection of the automated chat resource to the chat communication session;
   detecting, by the processor, a disconnection of the user device from the chat communication session;
   disconnecting, by the processor, the second connection of the first agent device operated by the first agent to the chat communication session and making the first agent device operated by the first agent available for receiving other chat communication sessions while also maintaining an open status of the chat communication session by having the automated chat resource remain connected to the chat communication session as an active participant, wherein the automated chat resource is configured to maintain the open status of the chat communication session for a predetermined timeout period so to enable the user device to disconnect and reconnect to the chat communication session repeatedly until an affirmative end to the chat communication session is detected;
   detecting, by the processor, the user device reconnecting to the chat communication session;
   once the user device is reconnected to the chat communication session, transmitting, by the processor, at least a first text-based message of the text-based messages generated by the automated chat resource to the user device, the first text-based message being generated in response to the detecting the user device reconnecting to the chat communication session;
   routing, by the processor, the chat communication session to a contact center resource, wherein the contact center resource comprises one of the first agent device operated by the first agent or a second agent device operation by a second agent; and
   transmitting, by the processor, a portion of a transcript of the chat dialog of the chat communication session to the contact center resource.

2. The method of claim 1, wherein the contact center resource is the first agent device; and
   wherein the portion of the transcript transmitted to the first agent device comprises the first text-based message generated by the automated chat resource.

3. The method of claim 2, further comprising transmitting, by the processor, an alert to the first agent device in response to detecting the user device reconnecting to the chat communication session.

4. The method of claim 1, wherein the contact center resource is the second agent device operated by the second agent;
   wherein the portion of the transcript transmitted to the second agent device comprises one or more text messages of the chat dialog exchanged between the first agent and the user before the disconnection of the user device occurred and the first text-based message generated by the automated chat resource.

5. The method of claim 4, further comprising transmitting, by the processor, an alert to the second agent device operated by the second agent in response to detecting the user device reconnecting to the chat communication session.

6. The method of claim 4, further comprising transmitting, by the processor, a message to the chat communication session to prompt the user that the first agent is not available.

7. The method of claim 1, further comprising transmitting, by the processor, a message to the chat communication session to prompt the user to initiate a communication via an alternative communication channel with the contact center resource.

8. The method of claim 1, further comprising the steps of:
   determining that the chat communication session is closed; and
   storing data associated with the chat communication session as part of a user profile of the user.

9. The method of claim 8, wherein the data includes a complete transcript of the chat dialog of the chat communication session.

10. A communication system of a contact center comprising:
    a processor; and a memory coupled to the processor, wherein the memory stores instructions that, when executed by the processor, cause the processor to:

identify initiation of a chat communication session through a communication network with a user device operated by a user;

establish a first connection to the chat communication session by an automated chat resource, wherein the automated chat resource is configured to listen to chat dialog of the chat communication session and to automatically generate text-based messages for display in response to the chat dialog without human intervention;

route the chat communication session to a first agent device operated by a first agent to create a second connection to the chat communication session while also maintaining the first connection of the automated chat resource to the chat communication session;

detect a disconnection of the user device from the chat communication session;

disconnect the second connection of the first agent device operated by the first agent to the chat communication session and making the first agent device operated by the first agent available for receiving other chat communication sessions while also maintaining an open status of the chat communication session by having the automated chat resource remain connected to the chat communication session as an active participant, wherein the automated chat resource is configured to maintain the open status of the chat communication session for a predetermined timeout period so to enable the user device to disconnect and reconnect to the chat communication session repeatedly until an affirmative end to the chat communication session is detected;

detect the user device reconnecting to the chat communication session;

once the user device is reconnected to the chat communication session, transmit at least a first text-based message of the text-based messages generated by the automated chat resource to the user device, the first text-based message being generated in response to the detecting the user device reconnecting to the chat communication session;

route the chat communication session to a contact center resource, wherein the contact center resource comprises one of the first agent device operated by the first agent or a second agent device operation by a second agent; and transmit a portion of a transcript of the chat dialog of the chat communication session to the contact center resource.

11. The communication system of claim 10, wherein the contact center resource is the first agent device; and wherein the portion of the transcript transmitted to the first agent device comprises the first text-based message generated by the automated chat resource.

12. The communication system of claim 11, wherein the instructions further cause the processor to transmit an alert to the first agent device in response to detecting the user device reconnecting to the chat communication session.

13. The communication system of claim 10, wherein the contact center resource is the second agent device operated by the second agent;

wherein the portion of the transcript transmitted to the second agent device comprises one or more text messages of the chat dialog exchanged between the first agent and the user before the disconnection of the user device occurred and the first text-based message generated by the automated chat resource.

14. The communication system of claim 13, wherein the instructions further cause the processor to transmit an alert to the second agent device operated by the second agent in response to detecting the user device reconnecting to the chat communication session.

15. The communication system of claim 13, wherein the instructions further cause the processor to transmit a message to the chat communication session to prompt the user that the first agent is not available.

16. The communication system of claim 10, wherein the instructions further cause the processor to transmit a message to the chat communication session to prompt the user to initiate a communication via an alternative communication channel with the contact center resource.

17. The communication system of claim 10, wherein the memory further stores instructions that, when executed by the processor, cause the processor to:

determine that the chat communication session is closed; and store data associated with the chat communication session as part of a user profile of the user.

18. The communication system of claim of claim 17, wherein the data includes a complete transcript of the chat dialog of the chat communication session.

* * * * *